United States Patent [19]

Barenyi et al.

[11] B 3,924,874

[45] Dec. 9, 1975

[54] PROTECTION DEVICE FOR VEHICLE PASSENGERS

[75] Inventors: Bela Barenyi, Maichingen; Hermann Renner, Magstadt, both of Germany

[73] Assignee: Daimler-Benz Aktiengesellschaft, Germany

[22] Filed: June 2, 1972

[21] Appl. No.: 259,236

[44] Published under the Trial Voluntary Protest Program on January 28, 1975 as document no. B 259,236.

[30] Foreign Application Priority Data

June 4, 1971 Germany.......................... 2127688

[52] U.S. Cl.............................. 280/150 B; 297/384
[51] Int. Cl.²......................................... B60R 21/10
[58] Field of Search.... 280/150 SB, 150 B, 150 AB; 297/384, 386, 388, 389, 390, 385; 296/65 A

[56] References Cited
UNITED STATES PATENTS

| | | | |
|---|---|---|---|
| 2,740,642 | 4/1956 | Atwood | 280/150 SB |
| 3,105,702 | 10/1963 | Larson | 280/150 B |
| 3,178,225 | 4/1965 | Bayer | 297/386 |
| 3,198,543 | 8/1965 | Presunka | 280/150 B |
| 3,351,382 | 11/1967 | Davies | 280/150 SB |
| 3,468,556 | 9/1969 | Smith | 280/150 B |
| 3,494,633 | 2/1970 | Malloy | 280/150 B |
| 3,620,569 | 11/1971 | Mathis | 280/150 SB |
| 3,690,696 | 9/1972 | Lincoln | 280/150 SB |

FOREIGN PATENTS OR APPLICATIONS

| | | | |
|---|---|---|---|
| 1,150,085 | 4/1969 | United Kingdom | 297/389 |

*Primary Examiner*—M. Henson Wood, Jr.
*Assistant Examiner*—Reinhard J. Eisenzopf
*Attorney, Agent, or Firm*—Craig & Antonelli

[57] ABSTRACT

A protection device for the passengers of vehicles, especially of passenger motor vehicles, in which an impact device pivotal from a rest position into a use position is provided within the area of the rear passengers; the pivotal connecting points of the impact device at a respective vehicle column are arranged in proximity to the backrests of the front seats and serve simultaneously as upper fastening points for the safety belts belonging to the front seats.

11 Claims, 6 Drawing Figures

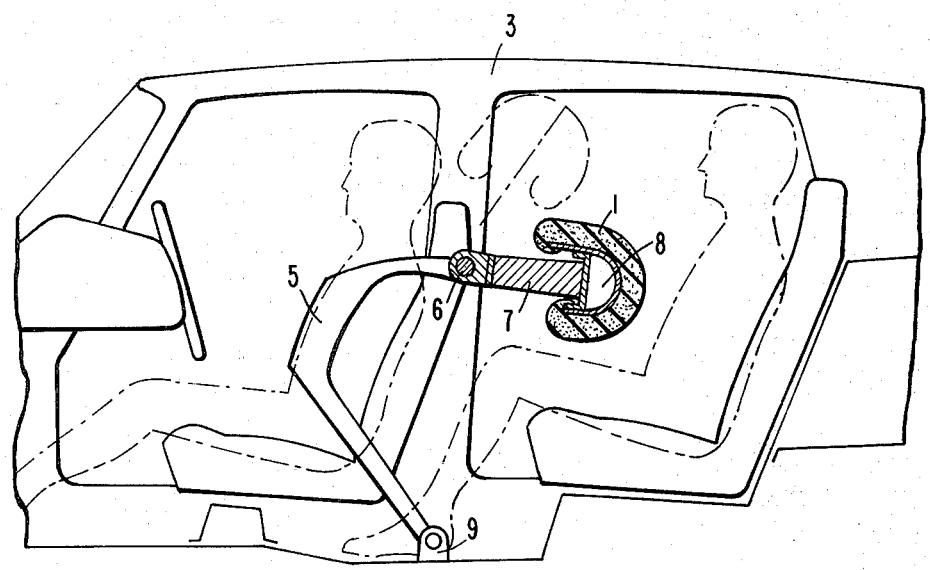
FIG. 1a
FIG. 1b
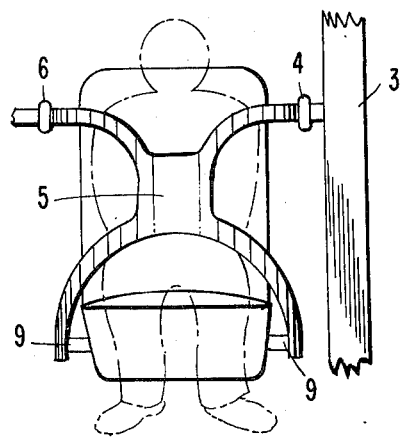

PROTECTION DEVICE FOR VEHICLE PASSENGERS

The present invention relates to a protection device for the passengers of vehicles, especially of passenger motor vehicles, in which an impact device pivotal from a normal rest position into a use position is provided within the area of the rear passengers, whose pivotal connecting points are arranged respectively at a vehicle center column approximately in proximity to the backrests of the front seats, as disclosed in the copending application Ser. No. 196,062, assigned to the assignee of the present application.

A protection device for the passengers present in the rear of the vehicle is created by such an arrangement, by means of which these passengers are protected in an optimum manner in case of a collision of the vehicle.

The present invention is now concerned with the task, starting with the proposal of the aforementioned application, to utilize the protective device described therein in a particularly advantageous manner also for the protection of the front seat passengers of the vehicle.

As solution to the underlying problem, a protection device of the aforementioned type is proposed in which according to the present invention the pivotal connecting points of the pivotal impact device simultaneously serve as upper fastening points for safety belts belonging to the front seats.

It is particularly advantageous for vehicles whose front seats are equipped with four-point safety belts, if an auxiliary bearer extending in the vehicle longitudinal direction within the area between the backrests of the front seats is secured at the impact device, whereby the center upper fastening points of the four-point safety belts are so arranged at the auxiliary bearer that they align at least approximately with the outer upper fastening points.

It is achieved by such an arrangement that also during a pivoting-up of the impact device, the belt tension for the forwardly seated persons does not change practically.

Finally, it may be of advantage for vehicles which are equipped with automatic reel-type or roll-up devices for the safety belts, if the hollow bearer of the impact device and/or the auxiliary bearer serve for the accommodation and mounting of the safety belts or of parts thereof.

Accordingly, it is an object of the present invention to provide a protection device for the rear passengers of motor vehicles which not only avoids by simple means the aforementioned shortcomings and drawbacks but additionally improves the protection for the front passengers.

Another object of the present invention resides in a protection device for the rear vehicle passengers which also serves at the same time advantageously for the protection of the front passengers of the vehicle.

A further object of the present invention resides in a protection device for the rear seat passengers of a passenger motor vehicle which is used also for the fastening of safety belts for the front seat passengers and which is so arranged that the belt tension for the front seats does not practically change even though the protection device for the rear passengers is caused to pivot in the upward direction.

Still another object of the present invention resides in a safety device for the rear seat passengers of passenger motor vehicles which also serves not only for the fastening points of the seat belts for the front passengers but also accommodates parts thereof, especially of automatic roll-up devices.

A still further object of the present invention resides in a safety device of the aforementioned type which is simple in construction and easy to install by the use of relatively inexpensive parts.

These and further objects, features and advantages of the present invention will become more apparent from the following description when taken in connection with the accompanying drawing which shows, for purposes of illustration only, one embodiment in accordance with the present invention, and wherein:

FIG. 1a is a schematic side view showing a further embodiment of the arrangement of FIG. 1;

FIG. 1b is a schematic front view of one front vehicle passenger using a four-point safety belt according to the arrangement of FIG. 1;

Figure 1:
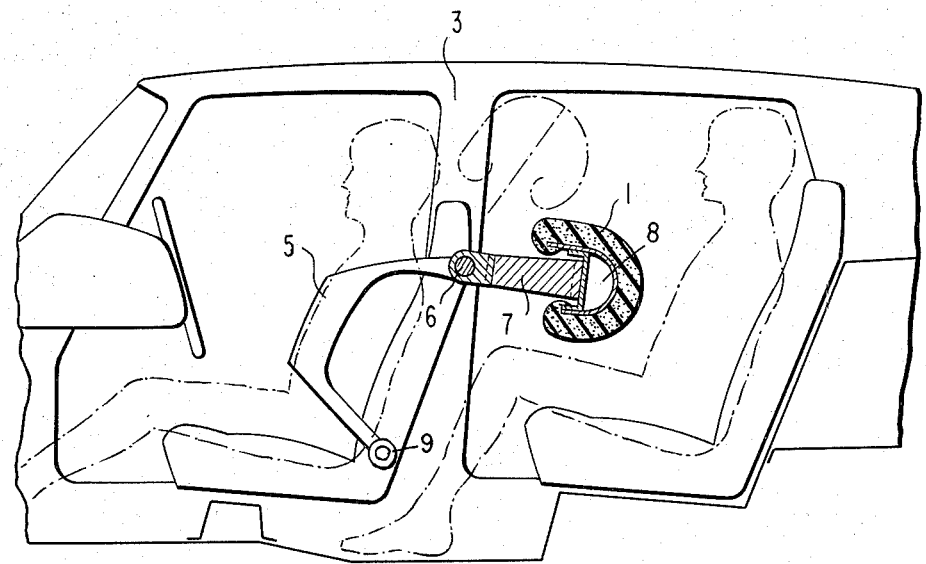
FIG. 1 is a schematic side view of a part of a passenger motor vehicle equipped in accordance with the present invention whereby the impact device and the auxiliary bearer are shown in cross section in the vehicle longitudinal center plane.
Figure 2:
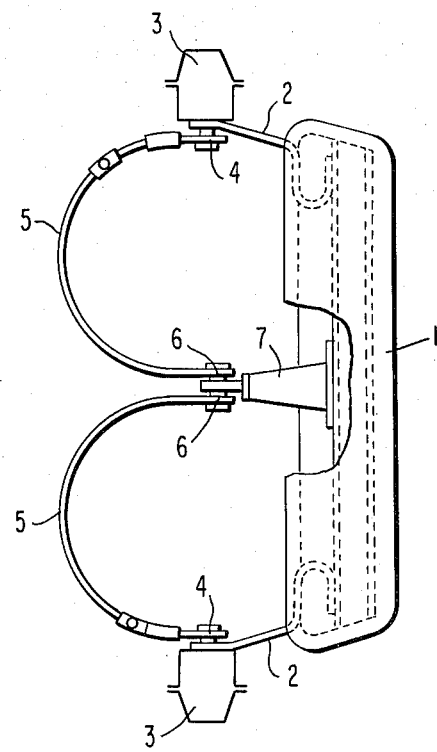
FIG. 2 is a plan view on the impact device, its pivotal connection and the fastening points of the front seat belts in accordance with the present invention.
Figure 3:
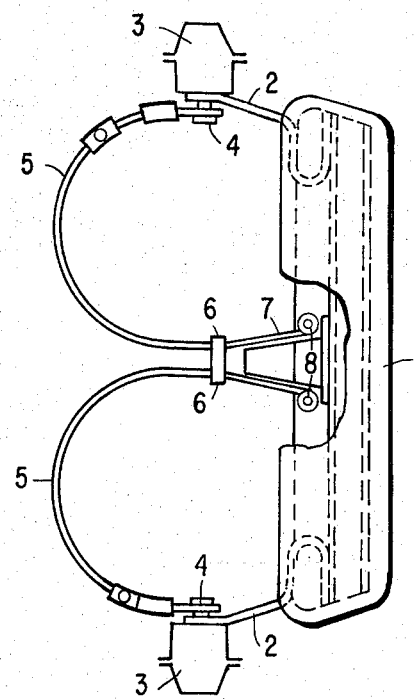
FIG. 3 is a modified plan view of the present invention.
Figure 4:
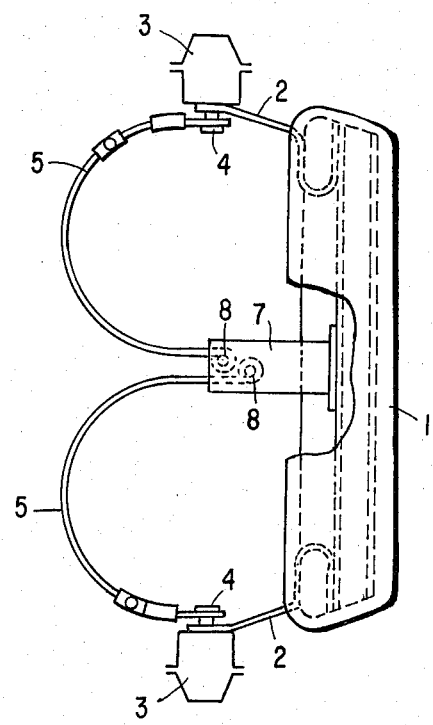
FIG. 4 is a plan view of a further embodiment of the present invention.

Referring now to the drawing wherein like reference numerals are used throughout the two views to designate like parts, the padded impact device 1 of any conventional construction, such as that illustrated in FIG. 1, including a hollow bearer or body 8 which also may serve for the accommodation of parts of the safety belt, i. e., an automatic reel-type or roll-up device of a conventional type, such accommodation being illustrated in FIG. 3, is pivotally connected respectively at the two vehicle center columns 3 under interposition of deformation members 2 of any conventional construction. The pivotal connecting points 4 of the impact device 1 thereby coincide with the outer upper fastening points of the illustrated four-point safety belts 5. The four-point safety belt is of a conventional type and as illustrated in FIG. 1b may be an X-shape or H-shape. The lower fastening points 9 are provided at either side of the front seat. Alternatively, as illustrated in FIG. 1a, the lower fastening points 9 may be provided at the floor of the vehicle. The central upper fastening points 6 of the four-point safety belts 5 are carried by an auxiliary bearer 7 extending in the vehicle longitudinal direction and secured at the impact device 1 in such a manner that the pivotal connecting points 4 and the pivotal connecting points 6 are aligned with each other, i.e., that the axes thereof are coaxial. The auxiliary bearer may also serve for the accommodation of the safety belt parts, such as a conventional automatic reel-type or roll-up device, as illustrated in FIG. 4.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. In a protection device for front and rear seat vehicle passengers, said device being of the type having an impact means pivotally mounted by at least one pivotal connecting means from at least the vehicle center columns approximately in proximity to front seat backrests of the vehicle so that the impact means are selectively provided in a substantially horizontal use position for the protection of rear seat passengers and in a substantially upright rest position, and said device having safety belt means for protecting front seat passengers, wherein the improvement comprises said at least one pivotal connecting means simultaneously including at least one upper fastening means for said safety belt means.

2. A protection device according to claim 1, wherein said safety belt means include automatic roll-up means and the impact means include a hollow body for accommodating parts of the safety belt means.

3. A protection device according to claim 2, wherein the hollow body accommodates parts of the safety belt means inclusive of the automatic roll-up means.

4. A protection device according to claim 3, wherein said safety belt means includes automatic roll-up means and said auxiliary bearer means accommodates parts of the safety belt means inclusive of automatic roll-up means.

5. A protection device according to claim 1, wherein an auxiliary bearer means secured at the impact means extends within the area between the backrests of the front seats essentially in the vehicle longitudinal direction, said auxiliary bearer means accommodating parts of the safety belt means.

6. In a protection device for front and rear seat vehicle passengers, said device having an impact means pivotally mounted by pivotal connecting means from each vehicle center column approximately in proximity to front seat backrests of the vehicle so that the impact means are selectively provided in a substantially horizontal use position for the protection of rear seat passengers and in a substantially upright rest position, and said vehicle having safety belt means for protecting front seat passengers, wherein the improvement comprises said pivotal connecting means simultaneously including an upper fastening means for said safety belt means, and wherein each of said safety belt means are four-point safety belt means, and further wherein an auxiliary bearer means secured to the impact means extends within the area between the backrests of the front seats essentially in the vehicle longitudinal direction, said upper fastening means for each four-point safety belt means including an upper central supporting point being arranged at the auxiliary bearer means and an upper outer fastening point at the pivotal connecting means, said upper central supporting point and said upper outer fastening point of each four-point safety belt means being approximately aligned.

7. A protection device according to claim 6, wherein said upper central supporting points and said upper outer fastening points are aligned coaxially.

8. A protection device according to claim 6, wherein said safety belt means include automatic roll-up means and the impact means includes a hollow body for accommodating parts of the safety belt means.

9. A protection device according to claim 8 wherein the hollow body accommodates parts of the safety belt means inclusive of the automatic roll-up means.

10. A protection device according to claim 6, wherein the auxiliary bearer means accommodates parts of the safety belt means.

11. A protection device according to claim 10, wherein the auxiliary bearer means accommodates parts of the safety belt means inclusive of automatic roll-up means.

* * * * *